INVENTOR
John B. Templeton

INVENTOR
John B. Templeton

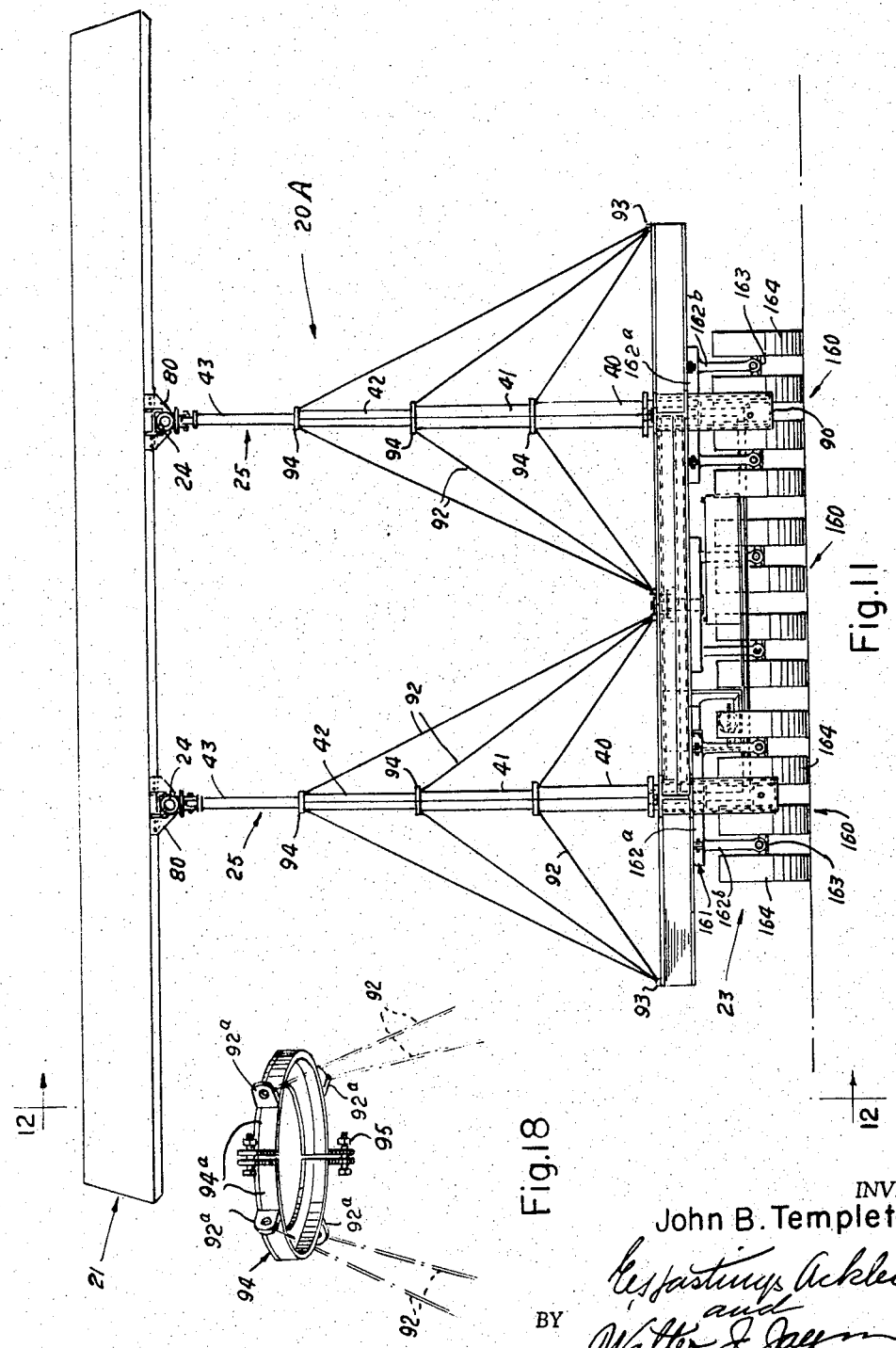

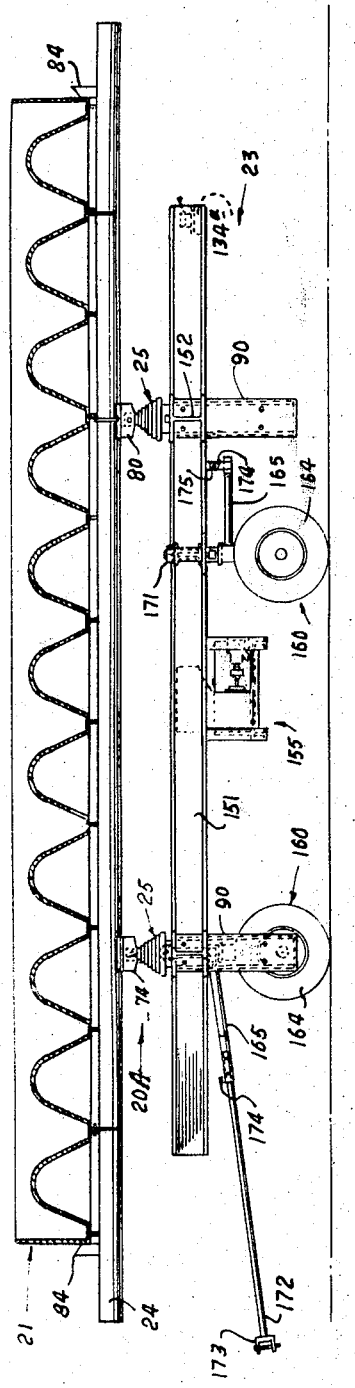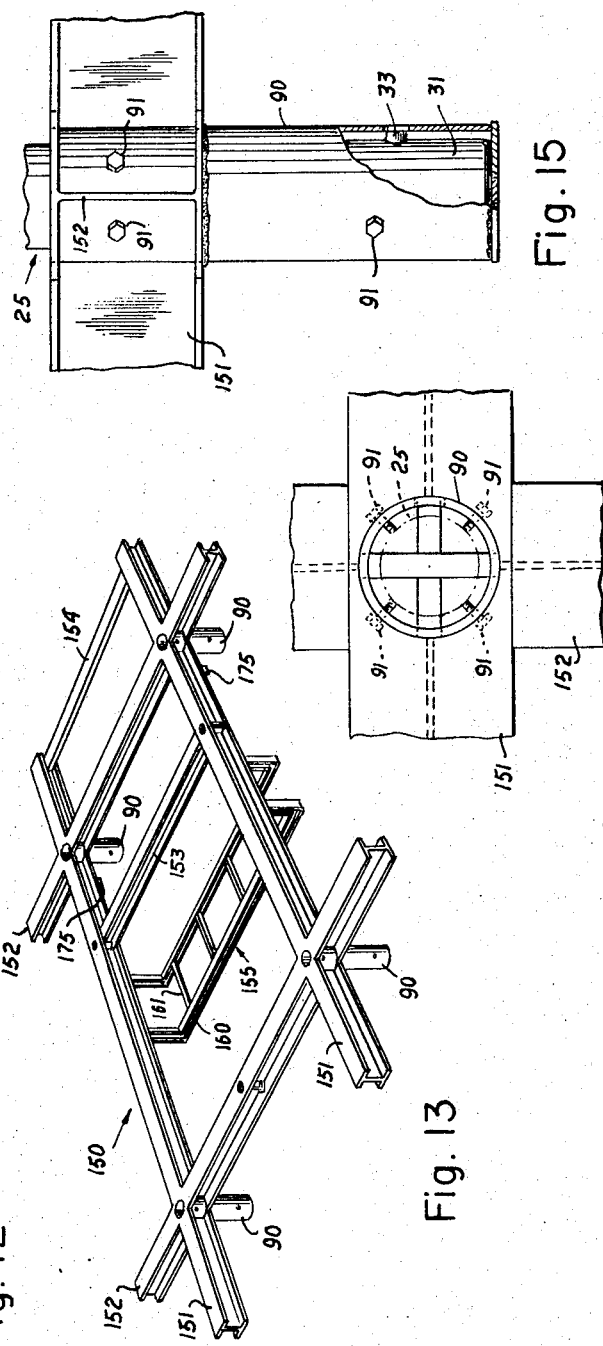

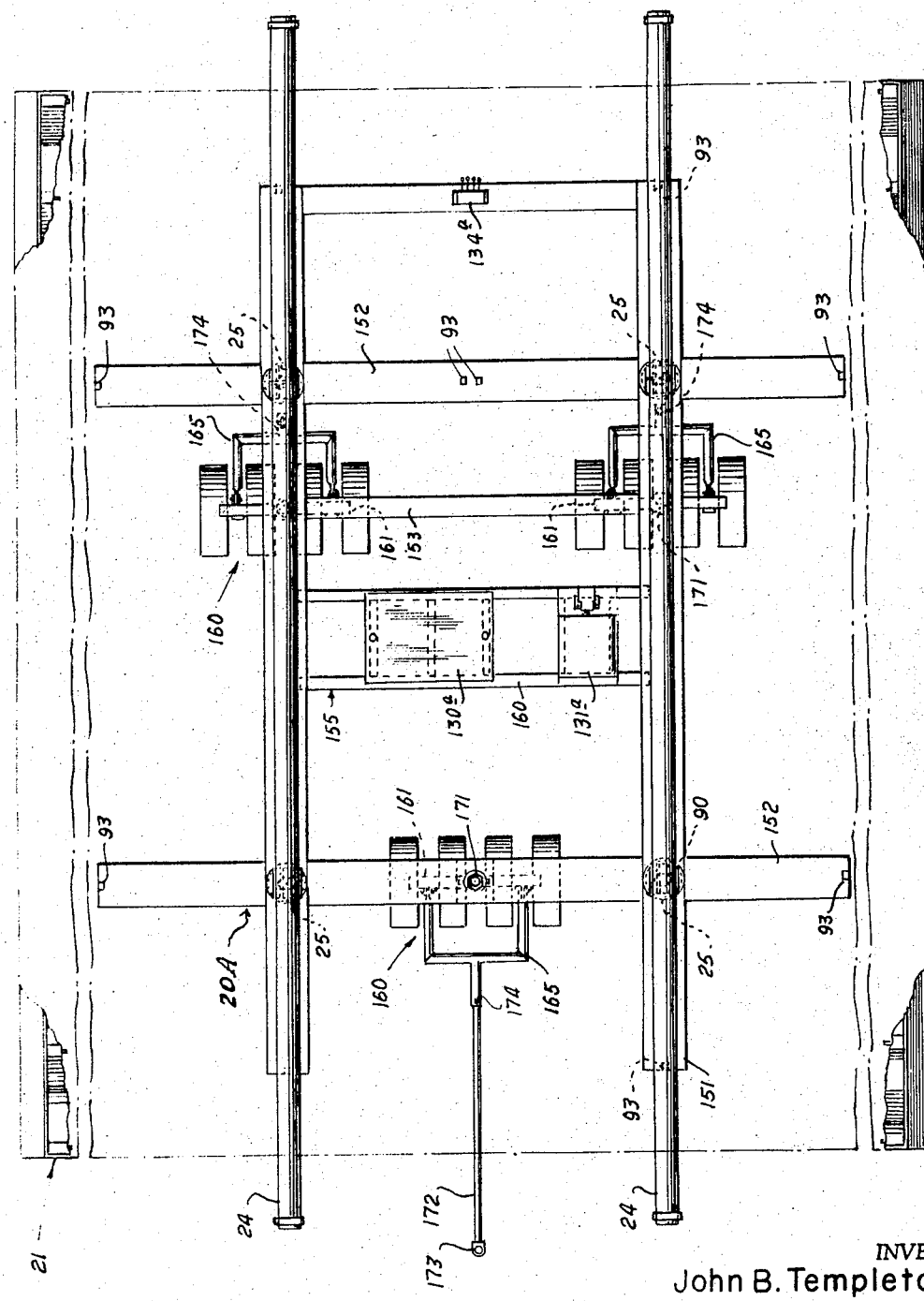

United States Patent Office

3,454,134
Patented July 8, 1969

3,454,134
LAND AND WATER FORM CARRIERS OR
SUPPORTS
John B. Templeton, 1000 Singleton Blvd.,
Dallas, Tex. 75212
Filed June 21, 1967, Ser. No. 647,783
Int. Cl. E04g *1/18, 3/10*
U.S. Cl. 182—141                                    14 Claims

ABSTRACT OF THE DISCLOSURE

Apparatus for supporting and carrying a body such as a work platform or form pans for pouring concrete roadway sections of bridges and the like including vertically extendable and retractable support columns braced at extended positions by guy wires. The support columns are mounted on either a floatable barge or a base frame movable on land.

---

This invention relates to support and transport apparatus and more particularly relates to apparatus for transporting and supporting work platforms, form pans, or the like, at a desired elevation for construction work and the like.

It is an object of this invention to provide movable support, elevator, and transport apparatus.

It is a particularly important object of this invention to provide a form carrier for supporting and transporting form pans for use in construction of roadway bridge sections and the like.

It is a further object of the invention to provide form pan support and transport apparatus usable on both land and water.

It is another object of the invention to provide transport and support apparatus vertically extendable and retractable guy wire braced columns for supporting form pans at desired elevation and attitudes.

It is another object of the invention to provide form pan transport and support apparatus including independently actuatable telescope-type ram units whereby both and lateral longitudinal height adjustments are made for accommodating the form pans to inclined and banked roadway sections.

It is another object of the invention to provide a form carrier including form holding members each connected on spaced vertically disposed hydraulic rams by pivotal saddle units one of which associated with each of the holding members allows a sliding relationship with the holding member for compensating in elevational differences of the ram for adjustment of the attitude or slope of each of the holding members while maintaining the rams at a fixed spaced relationship with each other.

It is also an object of the invention to provide a form carrier having transport means provided with well units for supporting expanable and retractable hydraulic rams for raising, lowering, and adjusting the attitude of supported forms.

It is another object of the invention to provide a barge mounted form carrier including scaffolding supported from form holding members and a ladder for personnel movement between the scaffolding and the barge.

It is another object of the invention to provide a form carrier for use an substantially solid surfaces which include wheel assemblies rotatable at least 90 degrees in either lateral direction from a longitudinal orientation to facilitate maneuverability of the carrier.

Additional objects and advantages of the invention will be readily apparent from the reading of the following description of a device constructed in accordance with the invention, and reference to the accompanying drawings thereof, wherein:

FIGURE 11 is an end elevation of a land based form pan carrier and support apparatus embodying the invention, showing its rams extended;

FIGURE 12 is a side elevation of the apparatus of FIGURE 11 with the hydraulic rams fully retracted;

FIGURE 13 is a view in perspective of the base frame of the apparatus of FIGURES 11 and 12;

FIGURE 14 is an enlarged fragmentary top view of a portion of the frame of FIGURE 13;

FIGURE 15 is an enlarged fragmentary side elevation, partially broken away, of a portion of the frame of FIGURE 13;

FIGURE 16 is a top plan view of the apparatus of FIGURE 12 with a substantial portion of the supported form pans broken away;

FIGURE 18 is an enlarged isometric view of the guy wire harness for the hydraulic rams.

Figure 1:
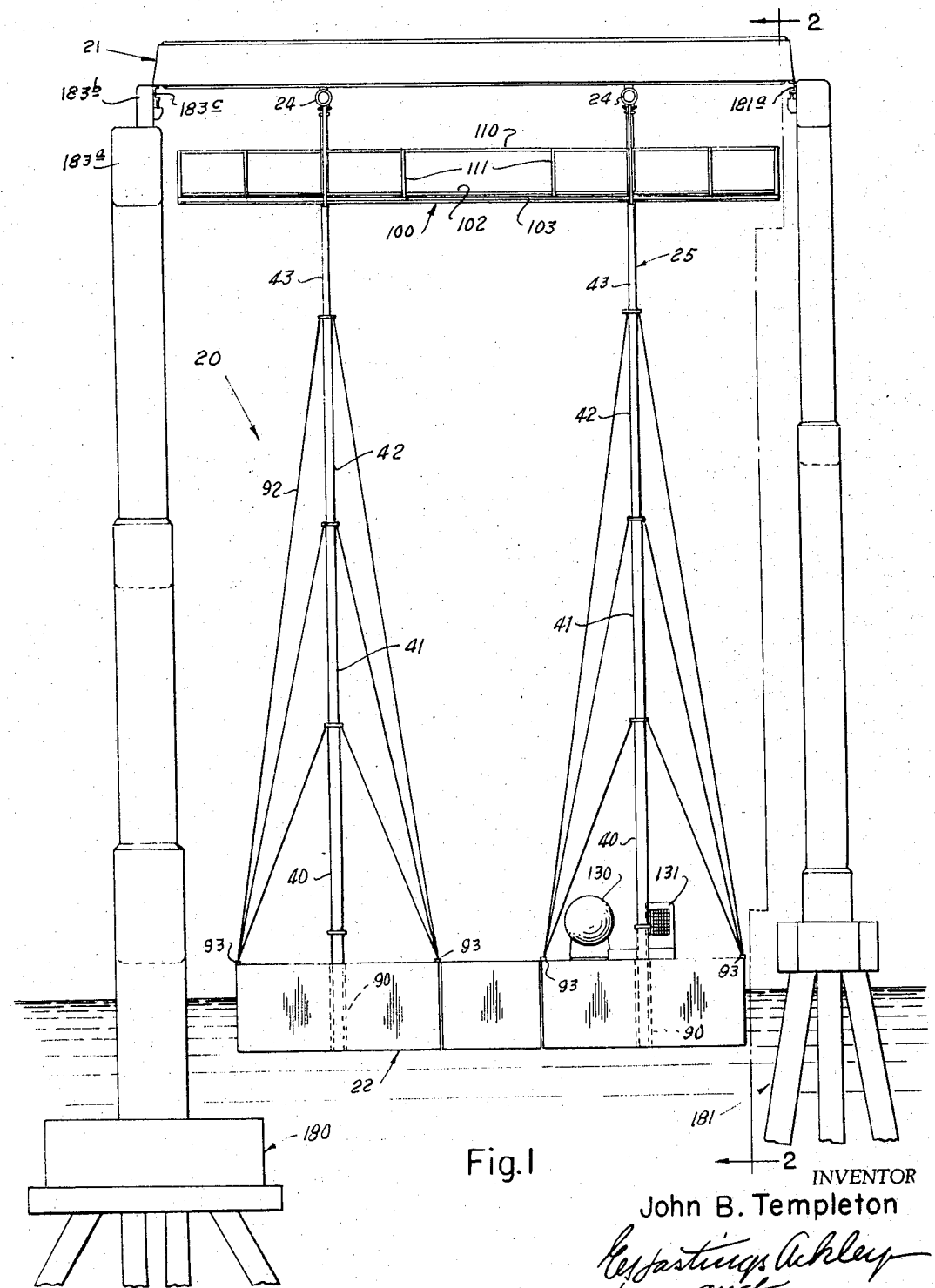
FIGURE 1 is a schematic end elevation of a form pan support and carrier apparatus embodying the invention on a barge at a water location between bridge bents showing the form pan support structure of the apparatus elevated to its operational position between the bridge bents.
Figure 2:
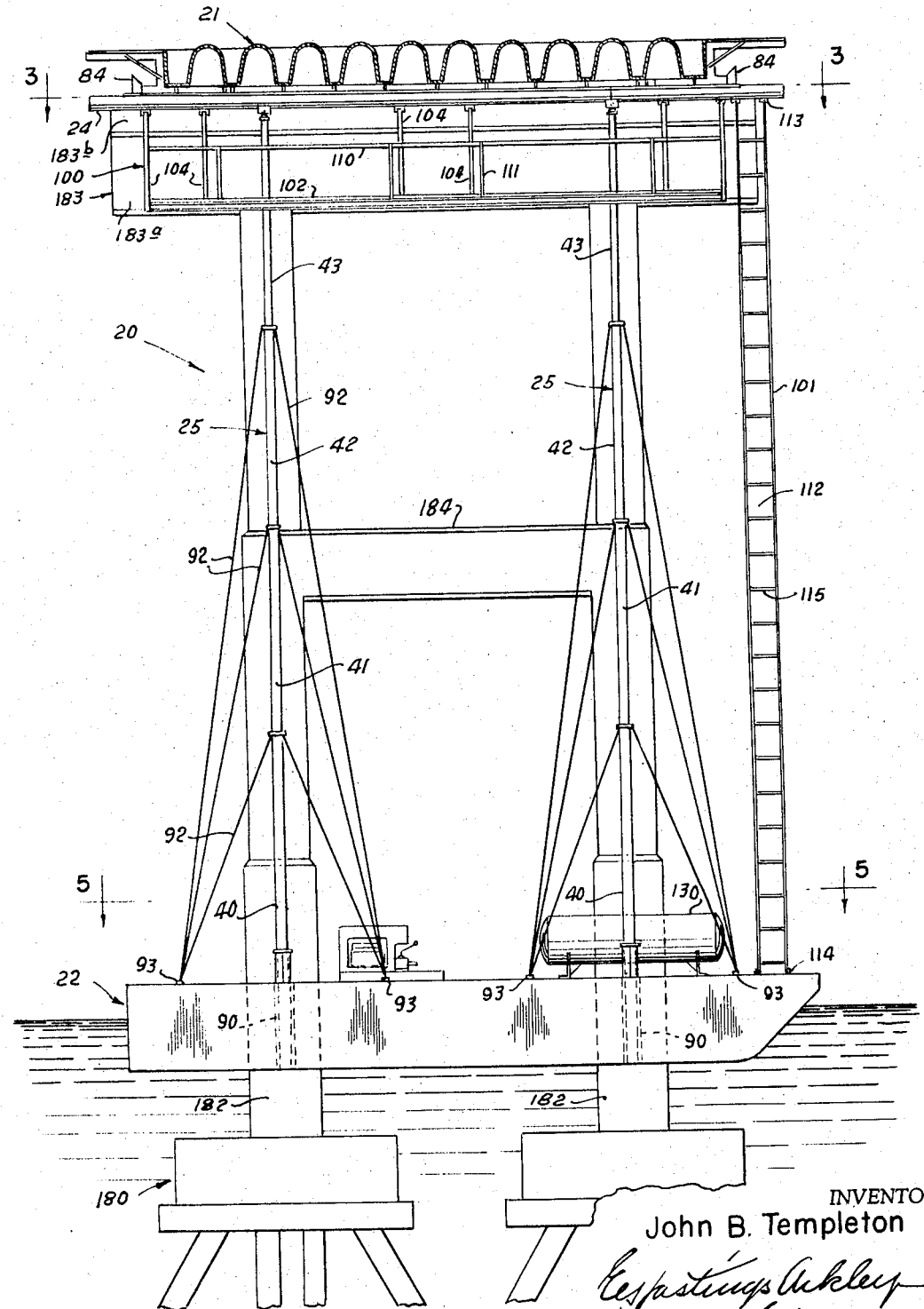
FIGURE 2 is a side elevation of the apparatus of FIGURE 1 along the line 2—2 of FIGURE 1.

In accordance with this invention, a form carrier 20 for use on water, FIGURES 1 and 2, and 20A for use on land, FIGURES 11 and 12, transports, raisers, lowers, and supports a group of form pans 21 at a desired elevation and attitude for securing the pans between bridge bents and the like for pouring concrete roadway sections. The carrier 20 has a floatable barge base 22 while the carrier 20A has a wheeled mobile frame 23.

Figure 5:
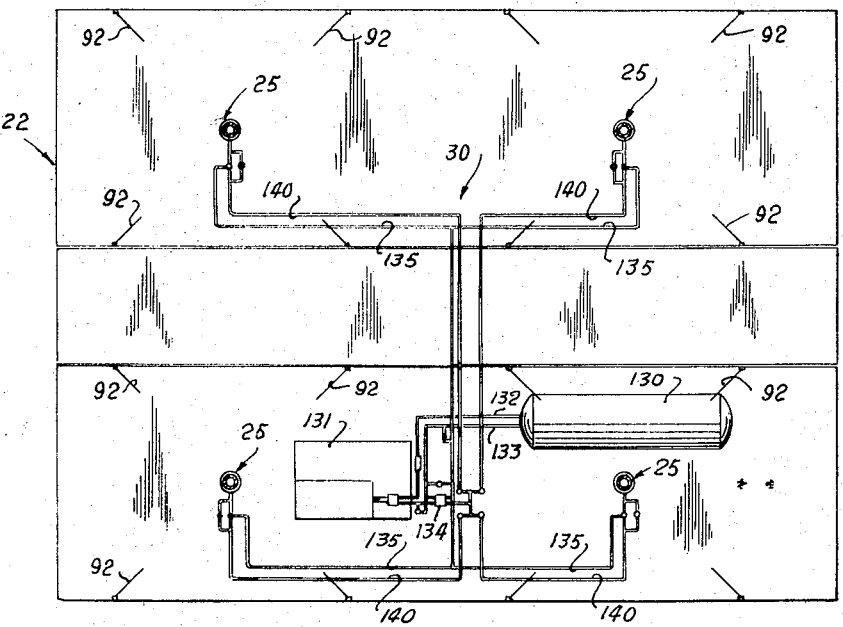
FIGURE 5 is a view taken along the line 5—5 of FIGURE 2, showing particularly a hydraulic system for raising and lowering the telescoping rams.

The form carriers each have a pair of generally parallel spaced support members 24, each of which is supported on a pair of spaced hydraulic rams 25. The hydraulic rams are operated by fluid pressure supplied by a hydraulic system 30 as seen in FIGURE 5. Each of the hydraulic rams 25 is independently extensible and retractable so that the inclination and elevation of each of the supports 24 is independently adjustable for providing any desired height and slope of each of the support members independent of the other whereby the height and the lateral and longitudinal slope of the form pans 21 may be varied to accommodate the form assembly to alignment in any desired roadway situation. When not in use and when in transit between locations, the hydraulic rams are fully retractable to position the form pans supports at a minimum horizontal elevation.

Figure 17:
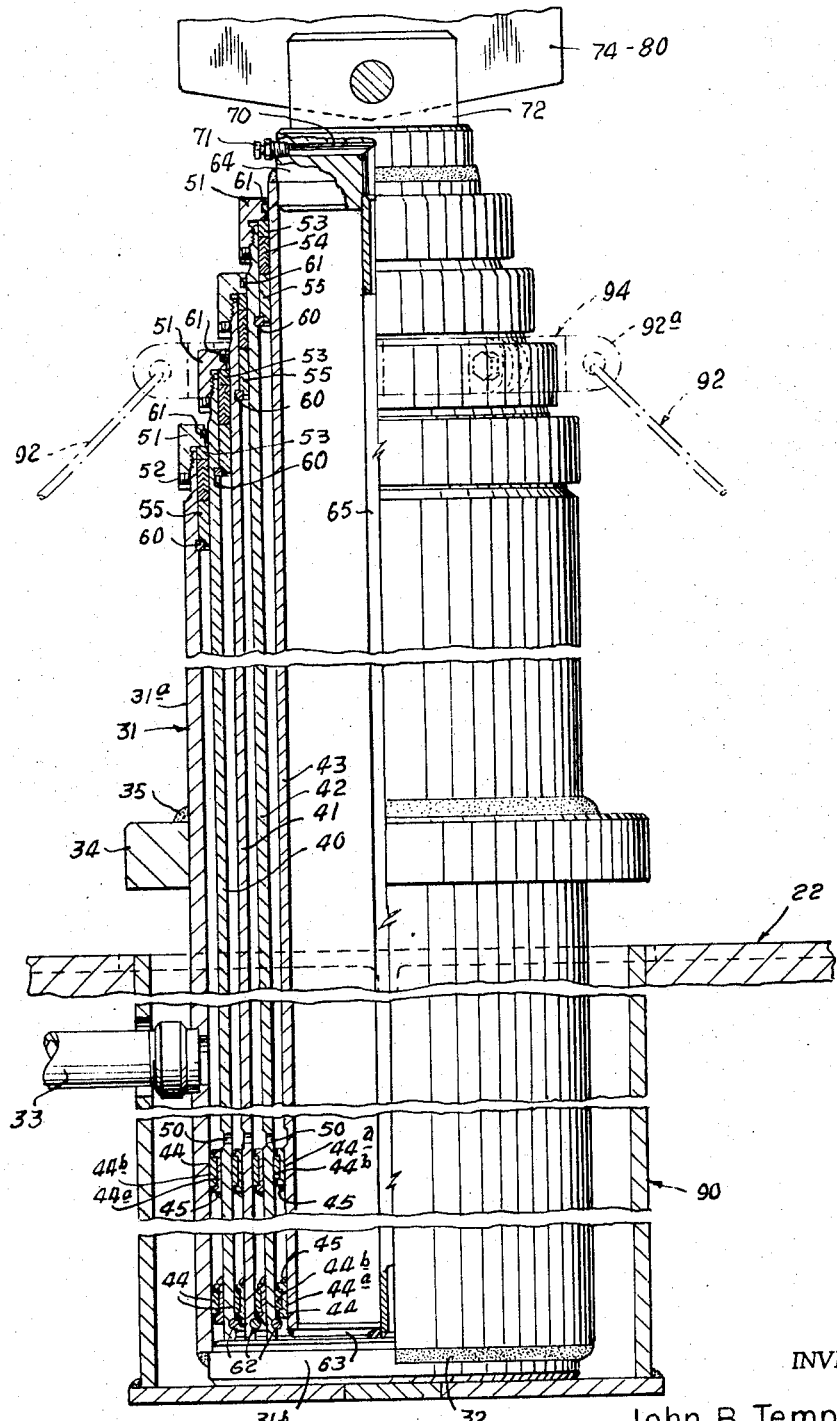
FIGURE 17 is an enlarged fragmentary view partly in section, of one of the telescopic hydraulic ram assemblies fully retracted.

Each hydraulic ram 25, FIGURE 17, has a base cylinder 31 which comprises a tubular body 31a open at its upper end and closed at its lower end by a bottom plate 31b suitably secured with the body as by a weld 32. A hydraulic fluid supply line 33 is connected into the base cylinder for supplying hydraulic fluid to the ram. An annular supporting flange 34 is secured on the body 31a as by welding at 35. A plurality of tubular pistons 40, 41, 42, and 43 are slidably supported in telescoping coaxial relationship within the base cylinder for movement between retracted and extended positions. Each of the pistons has a pair of lower longitudinally spaced guide bearings 44, each of which is suitably secured around its respective piston as by welding at 45. Each of the bearings 44 comprises a base ring 44a having a ring insert 44b of a bearing metal such as babbit. The guide bearings maintain the alignment of the lower portion of each of the cylinders as it is raised and lowered while allowing the cylinders to freely slide within each other and within the base cylinder. The pistons 40, 41, and 42 each have a fluid communication port 50 positioned above its upper guide bearing 44 for admitting hydraulic fluid to the interior thereof.

An annular retaining nut 51 is threaded on the upper end portion of the base cylinder 31 and locked against rotation by a plurality of circumferentially spaced set screws 52. A bearing ring 53, an annular packing 54, and a bearing ring 55 are confined within an upper end portion of the base cylinder and each piston between the nut 51 and an internal lock ring 60 to guide the piston therein and to seal between the outer surface of the piston and the inner surface of the surrounding cylinder or piston as the pistons are raised and lowered when extending and retracting the hydraulic ram. An internal wiper ring 61 is disposed in an internal annular recess of the nut 51 engageable with the outer surface of the piston for wiping the surface clean as the piston is lifted during the extension of the ram. The pistons 40, 41, and 42 each are similarly provided with the annular nut 51, ring bearings 53 and 55, annular packing 54, and a snap ring 60 for guiding and sealing with the pistons 41, 42, and 43. Upward movement of each of the pistons is limited by the engagement of the top end surface of the upper guide bearing 44 on the piston with the lower end surfaces of the snap ring 60 and ring bearing 55 encircling the piston. For example, upward movement of the piston 40 is limited by engagement of its upper guide bearing 44 with the snap ring 60 and ring bearing 55 of the base cylinder 31. Similarly, upward movement of the innermost piston 43 is limited by the engagement of its upper guide bearing 44 with the snap ring 60 and ring bearing 55 of the piston 42.

Each of the pistons 40, 41, and 42 has an internal lower snap ring 62 engageable by the lower guide bearing 44 of the piston it encircles. For example, the snap ring 62 in the piston 40 is engaged by the lower guide bearing 44 of the piston 41 thereby limiting the downward movement of the piston 41 relative to the piston 40. Similarly, the snap ring 62 of the cylinder 41 is engaged by the lower guide bearing 44 of the piston 42, and the snap ring 62 in the piston 42 is engaged by the lower guide bearing 44 of the innermost piston 43. The lower snap rings 62 function during the lowering of the hydraulic ram from an extended position such that when each of the pistons is lowered its lower ring bearing 44 engages the snap ring 62 of the encircling piston when the several pistons telescope downwardly as the ram retracts.

The innermost piston 43 has a ring shaped base closure plate 63 secured as by welding to the lower end of the piston and a circular head member 64 welded into the upper end of the piston. A central tube 65 is secured coaxially within the piston 43 extending through the base plate 63 and into an L-shaped flow passage 70 in the head member 64. A bleed valve 71 is threaded into the outer end portion of the flow passage 71 for bleeding air and fluid pressure from within the ram upwardly through the tubing 65 and the flow passage 70 of the inner piston 43 to assure that the ram is filled with hydraulic fluid. The upper end of the inner piston 43 of each of the rams is provided with a bracket 72 having a bolt hole 73 to receive a bolt for securing a support member saddle, as explained hereinafter.

Figure 7:
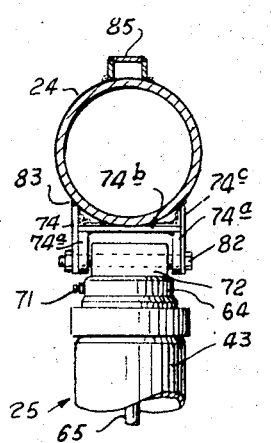
FIGURE 7 is a fragmentary view taken along the line 7—7 of FIGURE 6.
Figure 6:
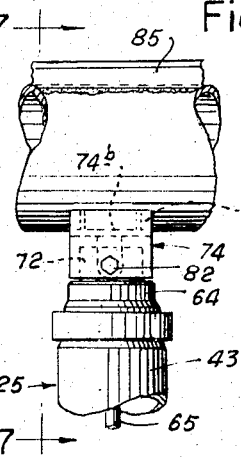
FIGURE 6 is a fragmentary view of one fixed connection between the upper end portion of one of the hydraulic rams and one of the form pan support members.
Figures 8, 9:
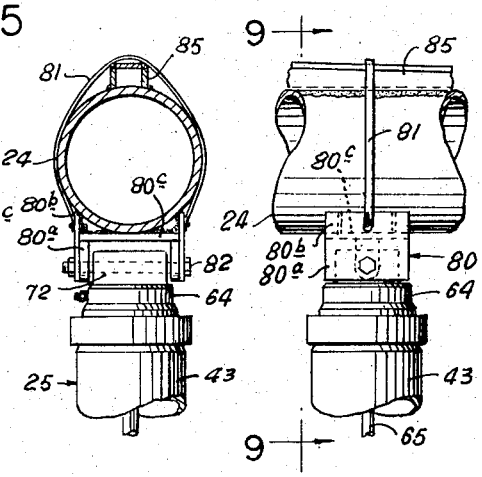
FIGURE 8 is a fragmentary view of the other slidable connection between the upper end portion of another of the ram assemblies and the form pan support member.
FIGURE 9 is a fragmentary view taken along the line 9—9 of FIGURE 8.
Figure 10:
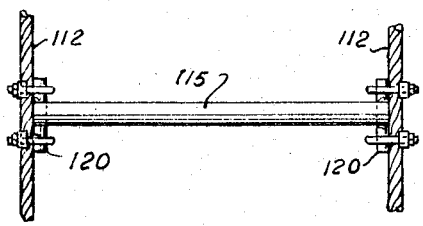
FIGURE 10 is a fragmentary view of a portion of the wire rope ladder extending between the walkway and the barge of the apparatus of FIGURES 1 and 2.

Each of the support members 24 is supported on a spaced pair of the hydraulic rams 25, FIGURE 2, with one of the rams having a top saddle member 74, FIGURES 6 and 7, secured as by welding to the support member and the other of the rams having a saddle 80 slidably supporting the support member 24 which is held in the saddle by a strap 81. The saddle 74 has a pair of downwardly extending flange portions 74a connected by a horizontal member 74b. The flange portions 74a are secured to the bracket 72 by a bolt 82. The saddle also has upwardly extending parallel flange portion 74c welded to the support member 24. The saddle 80, FIGURES 8 and 9, similarly has downwardly extending parallel flange portions 80a secured by a bolt 82 to the bracket 72 on a ram 25, and a pair of spaced upwardly extending flange portions 80b to which opposite ends of the strap 81 encircling the support member 24 are secured for holding the support member in the saddle while allowing it to slide longitudinally in the saddle. The side flange portions of the saddle 80 are connected by an integral horizontal portion 80c. The saddles 74 and 80 thus provide pivotal connections between the support members and the hydraulic rams, a saddle 74 being permanently secured to each of the support members to hold it at the proper longitudinal position on its supporting rams while a saddle 80 supporting each member permits sliding movement of the member on one of its rams to accommodate the member to various sloping relationships when the two supporting hydraulic rams are extended to different heights. It will be obvious that different height relationships of the two supporting rams of each of the support members 24 alters the distance along the support member its saddles 74 and 80, so that a sliding relationship between the support member and one of the saddles is necessary to provide the desired flexibility of height and inclination adjustment by the rams.

Figure 4:
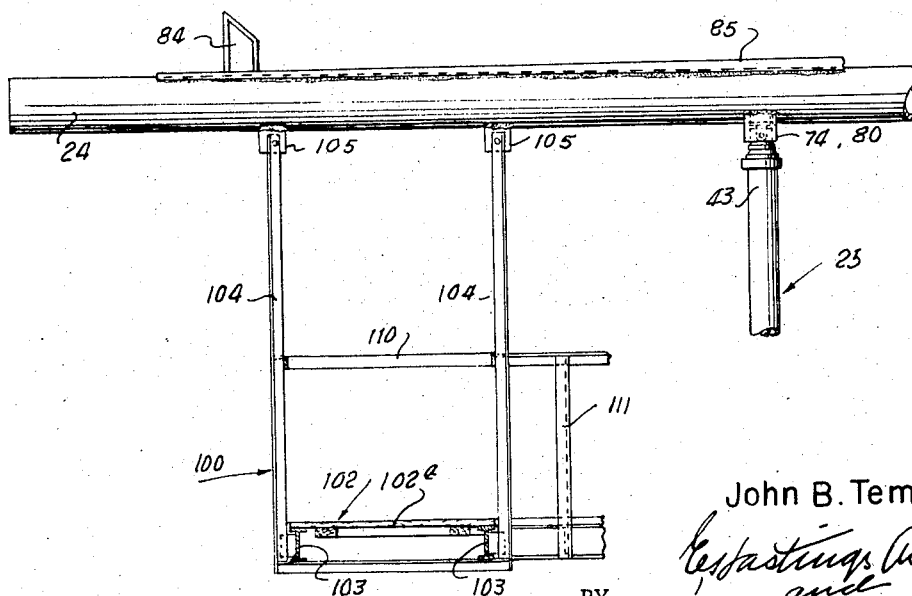
FIGURE 4 is an enlarged fragmentary view taken along the line 4—4 of FIGURE 3.

Each of the support members 24 has a pair of spaced upwardly extending stops 84, FIGURES 2, 4, and 12, for engaging opposite side edges of the group of form pans 21 for holding the pans on the supports. A shim 85, FIGURES 2 and 4, tapered from its center toward its opposite ends is secured along the top surface portion of the support members 24 of the carrier 20 to provide supporting surfaces for the form pans so that laterally they slope slightly downwardly toward the ends of the support members such that a crown is formed in the roadway section poured in the form pans which slopes from along its longitudinal center line downwardly to its outer edges.

In the form carrier 20 each of the hydraulic rams 25 is supported in a well 90 provided in the barge 22 to receive the base cylinder 31 of the ram. Each well 90 may be provided with a bottom closure plate, not shown, for supporting the base cylinder of the ram, or, alternatively, the well may be opened to the water at its bottom end with the flange 34 of the base cylinder of the rams engaging the barge deck to support the ram in the well. The wells may also be provided with upper and lower circumferentially spaced locking or set screws 91 as shown in the carrier 20a, FIGURES 14 and 15, for stabilizing the rams. The inward ends of the set screws engage the outer wall surface of the base cylinder 31 of each of the rams.

Each of the pistons of each ram 25, when extended as in FIGURES 1, 2, and 11, is braced at its upper end by a plurality of downwardly divergent guy wires or cables 92. The lower ends of each set of guy wires 92 are connected to eye brackets 93 secured on the barge deck of the carrier 20 and on the frame of the wheeled vehicle 23 of the carrier 20a, FIGURE 11. The upper ends of each set of guy wires are secured to a split collar 94, FIGURE 18, disposed over the annular cap nut 51 of each of the extensible pistons 40, 41, and 42. The split collar comprises half section portions 94a secured together surrounding the cap nut by bolts 95. The collar 94 has circumferentially spaced eye brackets 92a for connecting the upper end of each of the guy wires 92 to the collar. While a set of the guy wires and collar are not illustrated connected with the upper end of the piston 43 it will be obvious that they may be included in the structure if conditions necessitate additional bracing when the rams are extended to their maximum height.

Figure 3:
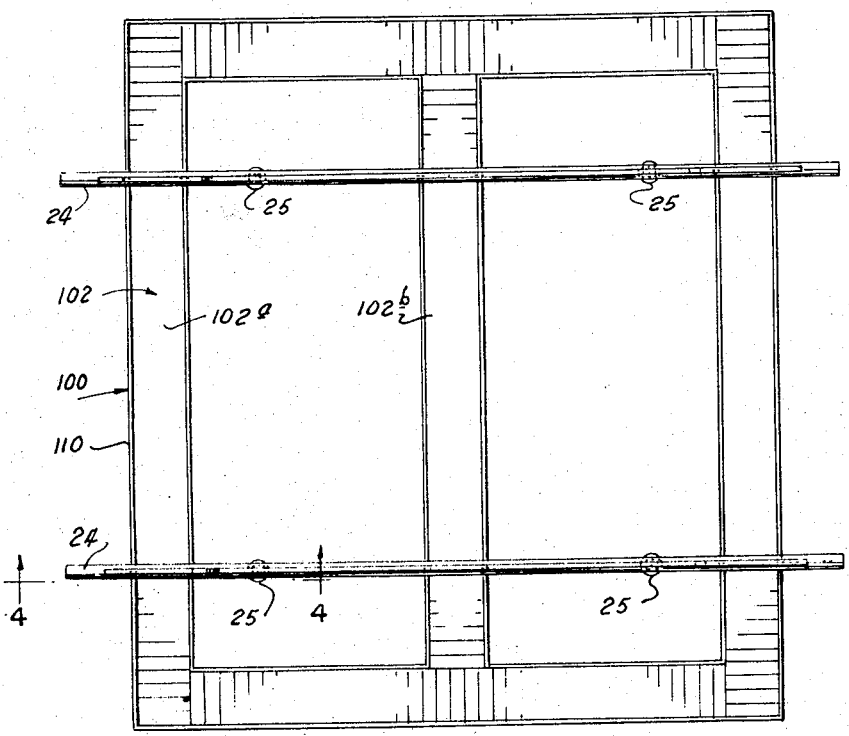
FIGURE 3 is a view along the line 3—3 of FIGURE 2 showing only the top lateral support members and a walkway suspended therefrom.

The barge supported form carrier 20 includes a scaffolding 100 and a ladder 101, FIGURES 3 and 4, both suspended from the support members 24. The scaffolding includes a walkway 102 comprising peripheral sections 102a and a central transverse section 102b mounted on horizontal beams 103 supported from vertical members 104 pivotally connected at their upper ends with brackets 105 which are secured to the under side of the support members 24. A safety hand rail 110 extends along each side of each section of the walkway. The scaffolding provides safe support means for workmen carrying out duties in connection with the positioning and securing of the form pans at their proper locations on bridge bents or piers for pouring roadway sections. The ladder 101 includes vertical wire ropes 112 connected between the brackets 113 on one of the support members 24 and 114 on the barge deck. A plurality of spaced parallel rungs 115 are secured between and normal to the cables 112 by clamps 120. The ropes permit the ladder to fold or collapse when the rams are lowered.

Control of the extension and retraction of each of the hydraulic rams for positioning the support members 24 at the desired height and inclination is effected by the hydraulic system 30, FIGURE 5, which selectively supplies hydraulic fluid to and bleeds it from the rams. The hydraulic system includes a storage tank 130 and an engine driven hydraulic pump 131. The pump and storage tank are interconnected by a suction line 132 and a return line 133. The pump supplies hydraulic fluid through a master valve 134 to supply lines 135 leading to each of the hydraulic rams. Hydraulic fluid is returned from each hydraulic ram through return lines 140 to the master valve which directs the fluid to the return line 133 leading back to the tank 130. Other suitable conventional valves and lines, not illustrated in detail, are included for selectively controlling the individual supply and return of the hydraulic fluid with respect to each of the rams to permit selective extension and retraction of each of the rams individually, so that any desired height and inclination of the form pans is effected by the hydraulic system.

The form carrier 20A is supported for use on solid surfaces such as highways and the like by the wheeled vehicle 23, FIGURES 11–16. The vehicle has a frame 150, FIGURE 13, comprising longitudinal spaced I-beams 151 secured with lateral spaced cross I-beams 152 extending perpendicular between and beyond the longitudinal beams 151. Additional lateral support is provided by a pair of cross braces 153 and 154 secured between the inside edges of the longitudinal beams 151. A hanger frame 155, comprising a pair of parallel spaced U-shaped bar members 160 interconnected by parallel spaced cross bars 161, is supported beneath the longitudinal beams 151 substantially midway between the cross beams 152 for supporting the hydraulic system for controlling the extention and retraction of the hydraulic rams. The wells 90 for receiving and supporting the hydraulic rams are secured in the frame extending vertically downwardly therefrom at the intersections of the cross beams 151 with the longitudinal beams 151.

The frame 150 is mounted on a single front wheel assembly 160 and a pair of laterally spaced identical real wheel assemblies 160. Each of the wheel assemblies comprises a downwardly extending U-shaped frame 161 having a top plate 162a and parallel spaced downwardly extending members 162b each of which supports an axle 162 on which a pair of wheels 164 are mounted on opposite sides of the member 162b. A tongue 165 is secured to the top plate 162a of the wheel frame 161 for pulling and guiding each of the wheel assemblies. The front wheel assembly is pivotally secured by vertical shaft 171 to the front cross beam 152 with the wheel assembly being rotatable 90 degrees in either direction for a total rotational arc of 180 degrees so that the apparatus is movable laterally. The tongue of the front wheel assembly has an extension 172 extending beyond the one end of the support members 24 of the form carrier and is provided with an eye member 173 for the connection of a pulling vehicle such as a tractor or truck, not shown. The rear wheel assemblies are each similarly secured by a vertical shaft 171 to the longitudinal beams 151 at the ends of the cross brace 153. Each of the tongues of the rear wheel assemblies has an eye member 174 used for locking its wheel assembly against turning. The front wheel assembly is left free to turn for guiding purposes during movement of the apparatus between the locations. The tongues of the rear wheel assemblies are locked during transit by batting their eye members 174 each with a downwardly extending similar eye member 175 secured on the bottom face of each of the longitudinal beams 151. Each of the rear wheel assemblies may be turned laterally 90 degrees in either direction after disconnection of its tongue from the I-member 175, to permit the vehicle to be moved laterally.

The form carrier 20A includes a hydraulic system substantially identical to the system 30 shown in FIGURE 5 for selectively hydraulically controlling the extension and retraction of each of the rams 25. The major components of the hydraulic system supported on the hanger frame 155 include an engine driven hydraulic pump unit 131a and a storage tank 130a for the hydraulic fluid. The tank and pump are identical in function to the corresponding components of the hydraulic system 30 but may vary in size and shape to conform to the size and shape requirements of the hanger assembly. A master control valve 134a is mounted on the lateral brace 154 for controlling the hydraulic system to selectively extend and retract the hydraulic rams. Suitable hydraulic lines, valves, filters, and other standard components, are interconnected with the storage tank, pump, and master valve for providing control of the hydraulic fluid flowing to and from each of the hydraulic rams so that each of the rams is adjustable to the desired height for supporting the form pan 21 at the desired elevation and inclination.

Each of the hydraulic rams 25 of the carrier 20a is supported in its well 90, FIGURE 15, and held in place in the well by upper and lower set screws 91 which engage the outer surface of the cylinder 31 of the ram. The base plate 31b of each base cylinder rests on the bottom of the well. The lower ends of the guy wires 92 are connected to the brackets 93 secured on the lateral beams 152 and the longitudinal beams 151 spaced from the rams so that, when the rams are extended as in FIGURE 11, downwardly diverging guy wire bracing both longitudinally and laterally is provided for extended pistons of the rams.

The barge and wheeled vehicle supported form carriers 20 and 20A both are operated generally in the same manner. FIGURES 1 and 2 illustrate the barge supported form carrier in operating position between a pair of spaced bridge bents 180 and 181 supporting a group of form pans 21 between top portions of the bents for pouring a concrete roadway section between and to be supported by the bents. The particular bridge bent 180 shown in FIGURE 2 comprises a pair of spaced vertical columns or towers 182 which support a horizonal top or cap beam 183 extending beyond the outside faces of the columns.

The beam 183 has a large base section 183a and a smaller head section 183b. The columns are braced by an intermediate horizontal support 184.

While in transit, such as when moving from port to an operating position between bridge bents and also when moving from one operating locaion to another, the superstructure of the carrier is retracted as much as practicable to improve the stability of the apparatus in water. When the hydraulic rams are extended to their maximum height the barge is not as stable and thus not as safe to move between locations as when retracted to the maximum extent possible. Since the form carrier 20 includes the scaffolding 100, its hydraulic rams remain retracted to a height at which the walkway of the scaffolding is supported as near as possible to the deck of the barge. However, the carrier may be moved with the rams extended and the support in an elevated position. The hydraulic system equipment, such as the pump 131, the storage tank 130, and the pump 131, is preferably located on the barge to fit within the open spaces of the walkway so that the walkway structure may rest on the top deck of the barge, thereby improving the stability of the carrier by minimizing the height of the structure while in transit. The guy wires 92 along with their collars 94 may be connected with the cap nuts 51 on the extensible pistons of the hydraulic rams with the lower end portions of the guy wires being laid along the deck until the pistons are to be raised to their operating height, at which time the guy wires connected to the brackets 93 are drawn taut. The lower ends of the guy wires generally are secured to their brackets before the pistons are to be raised to their operating height since such height will not vary between locations and the several lower cylinders of the hydraulic rams below the uppermost cylinder are extended to the same height for properly positioning the form pans. To prevent possible entanglement of the guy wires during transit the wires and their collars may be attached to the hydraulic rams when the carrier is at the location at which the rams are to be raised. It will be noted that no collar and guy wires are provided for the uppermost piston 43 of the hydraulic rams, since this piston provides the height adjustment. It will be obvious that if the stability of the rams at their fully extended positions necessitates further bracing, a set of such wires and a collar 94 may be readily attached to all of the ram pistons before they are extended to operating heights.

The ladder 101, also, is either connected only at its upper end to one of the support members 24 with a major portion of the ladder being folded on the deck of the barge, or the ladder is left completely disconnected and stored on the barge until the rams are raised. The ladder is pulled taut and secured at its lower end to the deck when the support members are at their operating height.

A group of form pans 21 is positioned on the support members 24 between the stops 84, FIGURE 2, by means of which the form pans are both transported and raised to the bridge bents for securing thereto for pouring a roadway section between the bents.

With the form pans on the supports 24 and the hydraulic rams retracted to the extent required by the bridge structure, the barge 22 is moved in the water to its operating position between the bridge bents 180 and 181. The form pans are generally positioned on the supports 24 such that they extend across the barge so that the barge is moved between the bridge bents by heading its bow 93a between them and moving it until properly located, at which time the barge is suitably anchored or tied to the bents by any suitable means (not shown).

Preliminary to extension of the hydraulic rams for raising the form pans to the proper position between the top portions of the bridge bents, the sets of guy wires 92 with their collars 94 are assembled on the pistons of the hydraulic rams with the upper ends of the guy wires each being connected with its eye bracket 92a on its collar. Also, the ladder 101 is rigged so that it will be available for personnel to reach the scaffolding 100 when the form pan assembly is raised into the desired location. It will be apparent that if the guy wires with their collars and the ladder have been partially rigged before movement of the barge to its operating location, it will only be necessary to secure the lower end of the ladder after the support members have been raised to the proper height and inclination.

The support members 24 are raised by extending each of the rams 25 to the desired height to align the group of form pans 21 between the bridge bents as shown in FIGURE 1. Hydraulic fluid is drawn by the pump 131 through the line 132 from the storage tank 130 and directed through the master valve 134 and the lines 135 to each of the hydraulic rams for applying fluid pressure through the input conduit 33, into the cylinder 31 of each of the rams. The fluid pressure is transmitted into the base cylinder of each of the rams and distributed within the cylinder between the various pistons 40–43 through the ports 50 in the pistons and along the pistons downwardly past the guide bearings 44 with the pressure being thereby distributed throughout the cylinder and pistons so that each of the cylinders is biased in an upward direction by the force resulting from the pressure of the hydraulic fluid applied to each of the cylinders over its downwardly facing surface portions below its seals 54 at the head ends of the pistons.

When the fluid pressure within the rams is high enough to overcome the weight of the form pans, the scaffolding, and other related structure supported on the rams including the weight of the ram pistons, the rams being to move or extend upwardly. Each of the rams is extended upwardly in substantially continuous staged steps, each outer piston, along with all of the pistons within it moving upwardly as a unit until such outer piston reaches its maximum height, so determined by the guys 92 and the stops formed by the bearing 44 and snap ring 60. Then each next inner piston, together with those within it, is displaced upwardly until it reaches a maximum height determined by the guys 92 attached to its upper end and by the stops formed by the bearing 44 thereon and the snap ring 60 thereabove. Such upward movement of the several pistons continues until the rams are all extended to the required height to position the form pans at the correct elevation.

For example, the outermost piston 40 along with the pistons 41, 42, and 43 within it all move upwardly as a unit, until the guys 92 attached to the upper end of said piston 40 are taut and the ring bearing 44 on the piston 40 engages the lock ring 60 within the base cylinder 31, limiting the piston 40 against further upward movement. The packing 54 along with the bearing rings 53 and 55 within the base cylinder are held against upward movement by its annular nut 51, and thus the pistons of the hydraulic ram are lifted by an upward force resulting from the fluid pressure acting over an area of the piston within the line of sealing engagement of the packing 54 with the outer wall surface of the piston 40. When the piston 40 has reached its maximum height, the next inner piston 41 along with the pistons 42 and 43 move upwardly as a unit, until the guys 92 attached to its upper end are taut or until the upper ring bearing 44 on the piston 41 engages the lock ring 60 below the packing 54 within the piston 40, thus limiting the inner piston 41 against upward movement. Next, the piston 42 along with the piston 43 move upwardly until the piston 42 is similarly limited against upward movement. Lastly, the innermost piston 43 is lifted upwardly by a force resulting from the fluid pressure acting over an effective area defined by the sealing engagement of the packing 54 within the piston 42 with the outer wall surface of the piston 43.

Generally, all of the hydraulic rams are extended simultaneously until the support members 24 have substantially reached the maximum height to which they are lifted for supporting the form pans at the upper ends of the bridge bents. Of course, as each of the hydraulic rams approaches its maximum height it requires individual adjustment to support the form pans at the exact desired elevation which may include adjusting them to either a longitudinal or a lateral slope, or both. The inclination adjustments are made by individual control of the extension of the innermost cylinder 43 of each of the hydraulic rams by means of the valves in the line leading to such rams. The inclination adjustments are made by any suitable series of steps, such as by raising each of the rams to its predetermined height; or alternatively, the rams may be simultaneously raised to the height of the lowest of the rams with the others being individually raised farther to achieve the desired inclination; or another approach is to raise all of the rams to the height of the highest of the rams with the required rams being selectively lowered to achieve the desired inclination or slope of the form pans. As illusrated in FIGURE 1, the form pans are finally brought to a position of rest with their opposite end portions resting on the channel beam 183c of the bent 180, and the beam 181a of the bent 181, respectively. Workmen on the scaffolding 100 make the necessary connections between the form pans and the bridge bents and carry out such other procedures as positioning and tying reinforcing steel, and the like.

If conditions permit, the hydraulic rams may be adjusted at heights to position the form pans at an elevation above the bridge bents and at the proper inclination so that the barge is maneuvered between the bridge bents to the proper location and the hydraulic rams are then lowered to set the form pan assembly on the channels of the bents, following which they are secured to the bents in a suitable manner.

After positioning the form pans on and securing them to the bridge bents, the hydraulic rams are retracted to lower the support members, and the barge is moved from between the bents and used to raise, lower or move other groups of form pans. A roadway section is poured on the form pans, which are left in place on the bents until the concrete is sufficiently set that they may be safely removed. Of course, during the pouring and setting procedure the form carrier is free for use in setting, removing, and transporting other form pans, as has been stated.

When the form pans are ready to be removed, the barge is again maneuvered between the bridge bents with the support members 24 aligned generally beneath the form pans and the barge is suitably anchored or tied to the bents. The hydraulic rams are raised by applying fluid pressure into each of the base cylinders 31 until the support members 24 are again engaged with the form pans as illustrated in FIGURE 2, with the guy wires 92 secured between the upper ends of their respective pistons of the hydraulic rams and the brackets 93 on the barge to provide bracing for each of the extended rams. The form pans are released from the concrete road section by suitable procedures, such as by vibrating the pans to free them from the set concrete. The channel members 181 and any other temporary supporting means between the bridge bents and the form pans are removed to free the form pans to be lowered between the bents. With the form pans fully released from the bridge bents and resting on the support members 24, the hydraulic rams are lowered until each of them is retracted to the extent required for moving the form pans to a new position for installation between a pair of bents in the maner already described. The hydraulic rams are retracted by bleeding the hydraulic fluid from the rams through their lines 33 and the master valve back to the storage tank 130.

Thus, the barge supported form pan carrier is used to raise, lower, and transport form pans between locations on bridge bents, piers, or the like. Since the carrier does not support the form pans during the pouring and setting of a concrete roadway section, a single carrier is capable of handling a substantial number of form pans during the construction of a bridge, causeway, or the like.

The vehicile supported form pan assembly carrier 20A, shown in FIGURES 11–16, is operated in exactly the same manner as the barge supported carrier for raising, lowering, and transporting form pan assemblies in the construction of a bridge or elevated roadway over land. During transport on the carrier 20A, the form pans may be supported at a lower elevation with the rams 25 retracted as shown in FIGURE 12. The vehicle is moved by a tractor or similar power source connected with the tongue 172 on its front wheel assembly. The front wheel assembly is rotatably by the tongue for the purpose of steering or guiding the vehicle during transport. The rear wheel assemblies are generally locked in position aligned with the longitudinal beam 151 during transport between locations by bolting their brackets 174 with the brackets 175 of the vehicle frame. During the transport phase of the operation, some portions of which may occur along regularly traveled highways, the form pans may be raised to clear obstructions such as passing vehicles by extending the hydraulic rams to the necessary height for lifting the form pans above such vehicles. For stability purposes the form pans are, of course, kept at as low an elevation as possible during transport. Once the carrier is at the location at which the form pans are to be lifted into place on pilings, bridge bents, or the like, additional maneuverability of the vehicle is provided by release of the tongues of the rear wheel assemblies which are rotatable through 90 degrees arcs in either lateral direction, so that both the front and rear wheel assemblies may be rotated 90 degrees from their illustrated positions, whereby the vehicle is easily movable laterally in either directions to assist in properly positioning it and thus reduce the space required to maneuver into position.

The vehicle is moved between land supported pilings or bridge bents with the support members 24 aligned generally parallel with the top beams of the bridge bents, as illustrated in FIGURES 1 and 2. When the vehicle is properly positioned between the bents, the hydraulic rams are extended to elevate the form pans to the correct height and inclination for securing to the pilings or bents. The guy wires 92 secured between the brackets 93 on the frame 150 and the collars 94 on the hydraulic ram pistons, as shown in FIGURE 11, brace the extended ram while supporting the form pans at the tops of the bridge bents. The form pan assembly is suitably secured with the piling, bridge bents, or the like, and the hydraulic rams are then retracted, lowering the support members 24 from engagement with the form pans and thereby freeing the carrier for lateral movement from between the bents. The wheel assemblies are then swung through a 90 degree arc back to their original positions, and the carrier is in condition for movement alongside the line of bents of the bridge to a new position for manipulating another group of form pans while the previously set pans are used for pouring roadway sctions. This swinging of the wheel assemblies permits use of the carrier along temporary roadways built alongside the line of the bridge, or causeway or the like, providing for movement of the carrier laterally off the road between pairs of bents or sets of pilings and back to the temporary roadway for movement therealong, thus reducing the cost of building temporary roadways and the like. The raising and lowering of the hydraulic rams on the vehicle supported carrier are done in exactly the same manner as the raising and lowering of the corresponding apparatus in the barge supported version 20 of the carrier already described.

It will be obvious that on the form carrier 20A other means may be used in lieu of the wheel assemblies for moving the carrier along a roadway or other surface. For example, continuous track or flexible crawling type treads as used on some tractors may be used. Also, large low pressure balloon-type wheels may be used for soft soil applications.

It will now be seen that a new and improved apparatus for transporting and supporting form pans at a desired elevation and attitude has been described and illustrated.

It will be further seen that a new and improved carrier for transporting, raising, lowering and supporting form pans for use in pouring concrete roadway sections between bridge bents and the like has been described and illustrated.

It will be further seen that one embodiment of the form carrier is adapted for use on water, and that another embodiment of the form carrier is adapted for use on a substantially firm surface, such as on land.

It will also be seen that the form carrier includes vertically extendable and retractable support columns braced by guy wires at their extended positions for supporting form pans at desired elevations and attitudes.

It will be further seen that the extendable and retractable columns are telescopable hydraulically actuated rams.

It will also be seen that each of the hydraulic rams is independently actuatable by hydraulic pressure provided from a pressure source included in the form carrier.

It will also be seen that the form carrier includes form pan holding members each connected on spaced hydraulic rams by pivotal saddle units, one of which on each holding member is adapted to allow a sliding relationship with such holding member to compensate for elevation differences of said rams for adjustment of the attitude of each holding member while maintaining said rams at fixed spaced relationship along each holding member.

It will be further seen that the form carrier adapted for use on land includes wheel assemblies each of which is movable 90 degrees in either lateral direction from longitudinal orientation to facilitate maneuverability of the carrier.

It will be further seen that the barge supported embodiment of the form carrier includes scaffolding supported from its form pan holding members and a ladder for access to the scaffolding for personnel movement from the barge to the vicinity of the scaffolding to aid in sesuring the form pans on bridge bents and the like.

It is also believed readily apparent that, while the carrier has been described as being used for supporting and positioning concrete form pans, it is clearly useable for supporting a planar rectangular or other work platform on the support members so that a number of workmen and a large amount of materials may be lifted to an elevated position to perform other operations, construction, repair or the like. The work platform, in such case, is supported in exactly the same manner as the form pans previously described.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A carrier for transporting a body such as a work platform or concrete form and for positioning and supporting said body at a desired elevation and attitude comprising: transport means; a plurality of pairs of laterally spaced upright extensible and retractable sectional hydraulic ram means carried by said transport means, holding means for supporting said body connected with the upper ends of each pair of ram means for raising, lowering, and adjusting the attitude of said body; pivotal securing means connected between the upper end of each ram means of each pair of ram means and said holding means connected therewith, at least one of said securing means having a laterally slidable connection with said holding means permitting said pair of ram means when extended to maintain a constant lateral spaced relationship with each other when the attitude of said holding means connected with said ram means is adjusted; means on said transport means providing hydraulic fluid pressure for actuating said extensible and retractable hydraulic ram means; connector means securable with the upper end of each section of said hydraulic ram means; guy wire means connectable at one end with said connector means and at the opposite end with said transport means for basing said ram means at extended positions above said transport means.

2. A carrier as defined in claim 1 including: scaffold means supported from said holding means; and ladder means between said holding means and said transport means to provide personnel access from said transport means to said scaffold means.

3. A carrier as defined in claim 1 wherein said transport means comprises a floatable barge.

4. A carrier as defined in claim 1 wherein said transport means comprises a vehicle adapted to be moved on a substantially firm surface.

5. A carrier as defined in claim 4 including: a plurality of wheel assemblies each movable through predetermined arcs for moving and guiding said behicle.

6. A form carrier for transporting and for positioning and supporting a concrete form at a desired elevation and attitude comprising: at least two substantially parallel spaced form holding support members for supporting said form at said desired elevation and attitude: at least two pivotal brackets secured in spaced relation with each of said holding members, one of said brackets being secured in fixed relationship on said support member and the other of said brackets being adapted to permit sliding movement of said support member relative to said bracket for compensating for elevational differences between said brackets; hydraulic fluid actuated ram means connected at its upper end with each of said pivotal brackets, each of said ram means including a cylinder and a plurality of telescopable coaxial extensible and retractable pistons movable between retracted and extended positions responsive to fluid pressure transmitted into said cylinder; transport means for supporting said rams and for movement thereof between locations; securing means on said transport means receiving and supporting said hydraulic ram means whereby said means are extensible and retractable relative to said transport means; means providing a source of hydraulic fluid pressure supported on said transport means and connected with said hydraulic ram means for selectively controlling the extension and retraction of said pistons; cable securing means associated with at least some of said pistons for securing cables at upper end portions of said pistons for bracing said pistons at extended positions; securing means on said transport means connecting the other ends of said cables whereby said cables are drawn taunt when said pistons are extended.

7. A form carrier as defined in claim 6 wherein said transport means comprises a floatable barge.

8. A form carrier as defined in claim 7 wherein said securing means for said rams comprises a well unit for each said ram.

9. A form carrier as defined in claim 8 including scaffold means supported from said holding means.

10. A form carrier as defined in claim 9 including ladder means between said barge and said holding member for personnel access between said barge and said scaffold means.

11. A form carrier as defined in claim 6 wherein said transport means comprises a vehicle adapted to move on a substantially firm surface.

12. A form carrier as defined in claim 11 wherein said securing means for said rams comprises a well unit for each said ram.

13. A form carrier as defined in claim 11 wherein said vehicle includes a plurality of wheel assemblies, at least a portion of said wheel assemblies being movable for guiding said vehicle along a desired path.

14. A form carrier as defined in claim 12 wherein said wheel assemblies are each movable through an arc of at least 90 degrees in either direction between longitudinal and lateral directions.

References Cited

UNITED STATES PATENTS

| | | | |
|---|---|---|---|
| 312,789 | 2/1885 | Adams | 182—141 |
| 494,452 | 3/1893 | Witzel | 182—141 |
| 2,907,172 | 10/1959 | Crake | 61—46.5 |
| 3,091,305 | 5/1963 | Pickard | 182—141 |

REINALDO P. MACHADO, *Primary Examiner.*